US010681070B2

(12) United States Patent
Khalil et al.

(10) Patent No.: US 10,681,070 B2
(45) Date of Patent: Jun. 9, 2020

(54) METHOD TO IDENTIFY MALICIOUS WEB DOMAIN NAMES THANKS TO THEIR DYNAMICS

(71) Applicant: QATAR FOUNDATION, Doha (QA)

(72) Inventors: Issa Khalil, Doha (QA); Ting Yu, Doha (QA); Marc C Dacier, Doha (QA)

(73) Assignee: Qatar Foundatiion, Doha (QA)

( * ) Notice: Subject to any disclaimer, the term of this patent is extended or adjusted under 35 U.S.C. 154(b) by 266 days.

(21) Appl. No.: 15/606,481

(22) Filed: May 26, 2017

(65) Prior Publication Data

US 2018/0343272 A1    Nov. 29, 2018

(51) Int. Cl.
*H04L 29/06*      (2006.01)
*G06F 21/56*     (2013.01)
*H04L 29/12*     (2006.01)

(52) U.S. Cl.
CPC .......... *H04L 63/1425* (2013.01); *G06F 21/56* (2013.01); *H04L 61/1511* (2013.01)

(58) Field of Classification Search
CPC ............. H04L 63/1425; H04L 61/2007; H04L 61/1511; H04L 63/1416
See application file for complete search history.

(56) References Cited

U.S. PATENT DOCUMENTS 9,516,058 B2 * 12/2016 Antonakakis ....... H04L 63/1483
9,635,049 B1 *  4/2017 Oprea ................... H04L 63/145

OTHER PUBLICATIONS

Khalil et al.,"Discovering malicious domains through passive DNS data graph analysis." researchgate, page was uploaded by Issa Khalil on Mar. 3, 2016. pp. 1-14 (Year: 2016).*
Antonakakis et al., "Building a Dynamic Reputation System for DNS," In 19th USENIX Security Symposium, Washington, DC, USA, Aug. 11-13, 2010, Proceedings.
Antonakakis et al., "From Throw-Away Traffic to Bots: Detecting the Rise of DGA-Based Malware," In Proceedings of the 21th USENIX Security Symposium, Bellevue, WA, USA, Aug. 8-10, 2012.
Bilge et al., "EXPOSURE: Finding Malicious Domains Using Passive DNS Analysis," In Proceedings of the Network and Distributed System Security Symposium, San Diego, California, USA, Feb. 6-9, 2011.

(Continued)

*Primary Examiner* — Harunur Rashid
(74) *Attorney, Agent, or Firm* — Martin & Ferraro, LLP

(57) ABSTRACT

Methods and systems for detecting malicious domains. The method comprises storing domain data for a plurality of domains and selecting a relationship parameter which represents a relationship between at least two of the domains. The method further comprises generating a graph for the domains by identifying a plurality of domain nodes, connecting the domain nodes with a plurality of edges and calculating an edge weight for each edge. The method further comprises identifying at least one domain node as a known malicious domain node and the other domain nodes as candidate domain nodes, calculating a malicious score for each candidate domain node based on the edge weights and identifying a domain in the plurality of domains as malicious if the malicious score is within a predetermined range.

23 Claims, 9 Drawing Sheets

Domain Resolution Graph

Domain Graph

(56) References Cited

OTHER PUBLICATIONS

Cova et al., "An Analysis of Rogue AV Campaigns," In Recent Advances in Intrusion Detection, 13th International Symposium, RAID 2010, Ottawa, Ontario, Canada, Sep. 15-17, 2010. Proceedings.

Crawford et al., "Kwyjibo: Automatic Domain Name Generation," Software—Practice and Experience, 38(14):1561-1567, Apr. 2008.

Feily et al., "A Survey of Botnet and Botnet Detection," In Emerging Security Information, Systems and Technologies, 2009. SECURWARE '09. Third International Conference on, Jun. 2009.

Manadhata et al., "Detecting Malicious Domains via Graph Inference," In 19th European Symposium on Research in Computer Security, Wroclaw, Poland, Sep. 7-11, 2014.

Rahbarinia et al., "Segugio: Efficient Behavior-Based Tracking of Malware-Control Domains in Large ISP Networks," In 2015 Annual IEEE/IFIP International Conference on Dependable Systems and Networks (DSN), Rio de Janeiro, Brazil, Jun. 22-25, 2015.

Royal, P., "Quantifying Maliciousness in Alexa Top-Ranked Domains," Dec. 2012.

Schiavoni et al., "Phoenix: DGA-based Botnet Tracking and Intelligence," In Detection of Intrusions and Malware, and Vulnerability Assessment—11th International Conference, DIMVA 2014, Egham, UK, Jul. 10-11, 2014, Proceedings.

Sherwood et al., "Cooperative Peer Groups in Nice," Computer Networks, 0(4):523-544, Mar. 2006.

Stinson et al., "Towards Systematic Evaluation of the Evadability of Bot/Botnet Detection Methods," In 2nd USENIX Workshop on Offensive Technologies, WOOT'08, San Jose, CA, USA, Jul. 28, 2008, Proceedings.

Tamersoy et al., "Guilt by Association: Large Scale Malware Detection by Mining File-relation Graphs," In The 20th ACM SIGKDD International Conference on Knowledge Discovery and Data Mining, KDD '14, New York, NY, USA, Aug. 24-27, 2014.

Weimer, F., "Passive DNS Replication," Jul. 30, 2004.

Zhang et al., "Systematic Mining of Associated Server Herds for Malware Campaign Discovery," In 35th IEEE International Conference on Distributed Computing Systems, ICDCS 2015, Columbus, OH, USA, Jun. 29-Jul. 2, 2015.

* cited by examiner

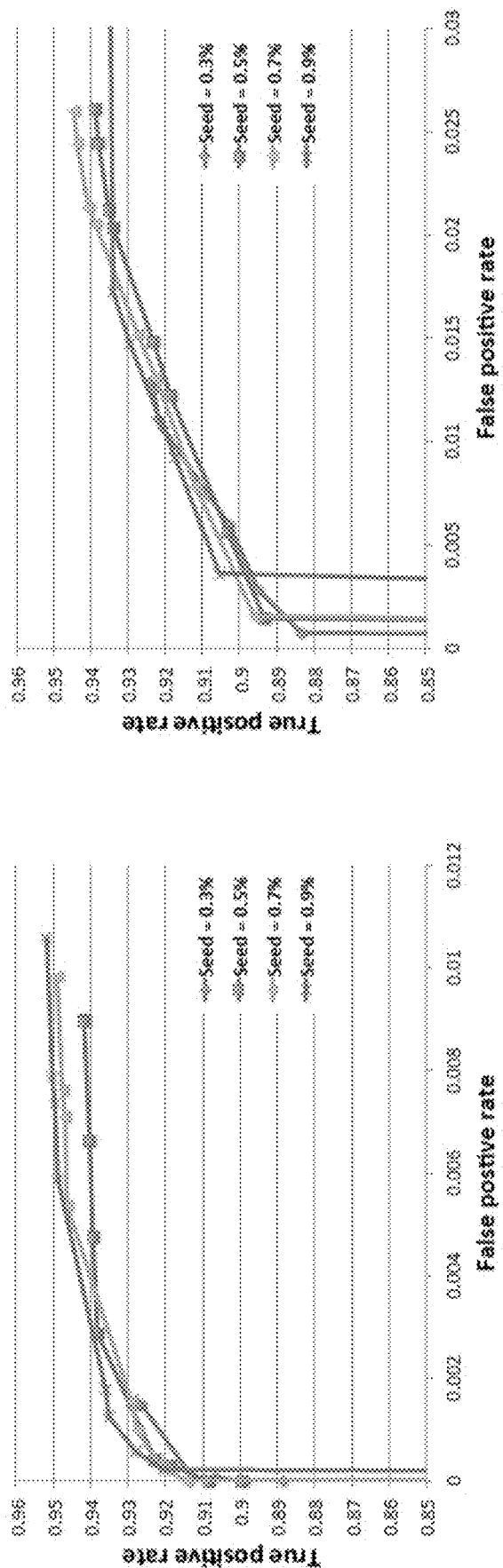

METHOD TO IDENTIFY MALICIOUS WEB DOMAIN NAMES THANKS TO THEIR DYNAMICS

FIELD OF THE INVENTION

The present invention relates to methods and systems for detecting malicious domains. The present invention more particularly relates to determining sources of malicious network traffic.

BACKGROUND OF THE INVENTION

Malicious domains are key components in a variety of different cyberattacks, such as phishing, botnet, command and control and spams. It is therefore important to be able to discover and block access to these attack enablers.

Many techniques have been proposed to identify malicious domains, utilizing different types of local network and host information [1, 3, 8]. DNS data has been exploited in some of these efforts. The general conventional approaches extract multiple features from DNS records as well as DNS queries and responses, which may further be enhanced with historical patterns and network traffic features of local hosts (those issuing DNS queries). Based on these features and some training datasets, a classifier can be built to distinguish malicious domains from benign ones.

Such approaches are effective as long as the features used in the classifier are not manipulated. However, it has been shown that many of the features used are not robust [12]. That is, attackers could change the features of malicious domains or infected hosts to evade detection. For example, patterns in domain names (e.g. number of characters or pronounceable words) can obviously be altered easily [5, 6] without affecting attacking capabilities. Similarly, attackers can also change the Time To Live (TTL) for DNS query caching if it is used as a feature for detection.

It has been proposed to identify malicious domains through analysis of DNS data. The general conventional approach is to build classifiers based on DNS-related local domain features. However, one problem with this conventional approach is that many local features (e.g. domain name patterns and temporal patterns) tend to be not robust. Attackers can easily alter these features to evade detection.

The present invention seeks to provide improved methods and systems for detecting malicious domains. Reference is made to "Discovering Malicious Domains through Passive DNS Data Graph Analysis," Proceedings of the 11th ACM on Asia Conference on Computer and Communications Security, Xi'an, China, May 30-Jun. 3, 2016; which is incorporated herein by reference.

SUMMARY OF THE INVENTION

According to one aspect of the present invention, there is provided a method for detecting malicious domains, the method comprising: storing domain data for a plurality of domains; selecting a relationship parameter which represents a relationship between at least two of the domains; generating a graph for the domains by: identifying a plurality of domain nodes which each correspond to one of the plurality of domains; connecting the domain nodes with a plurality of edges, each edge connecting two domain nodes that are related to one another by the selected relationship parameter; and calculating an edge weight for each edge which represents the strength of the relationship between the domains of the domain nodes connected by the edge; wherein the method further comprises: identifying at least one domain node as a known malicious domain node and the other domain nodes as candidate domain nodes; calculating a malicious score for each candidate domain node based on the edge weight of each edge connecting the candidate domain node to a known malicious domain node; and identifying a domain in the plurality of domains as malicious if the malicious score for the candidate domain node of the domain is within a predetermined range of malicious scores.

In some embodiments, the domain data is Domain Name System (DNS) data which comprises a DNS record for each of the domains.

In some embodiments, the DNS data comprises a plurality of DNS records for the plurality of domains stored at a predetermined time.

In some embodiments, each DNS record comprises a first domain identifier and a second domain identifier for a respective one of the plurality of domains.

In some embodiments, the first domain identifier indicates a domain name and the second domain identifier indicates an IP address for the domain.

In some embodiments, each DNS record further comprises first timestamp data indicating a first time at which the domain was resolved to a corresponding IP address and second timestamp data indicating a second time at which the domain was resolved to the IP address, the second time being more recent than the first time.

In some embodiments, the second time is the last time at which the domain was resolved to the IP address.

In some embodiments, the method further comprises: selecting the plurality of domains from the DNS data by selecting the domains having a DNS record with first and second timestamps that are within a predetermined time observation window.

In some embodiments, the relationship parameter is indicative of a similarity between a plurality of the DNS records.

In some embodiments, the relationship parameter is indicative of a plurality of the domains resolving to the same IP address.

In some embodiments, the relationship parameter is indicative of domains that have been controlled by a similar set of entities.

In some embodiments, the predetermined range of malicious scores is a range of malicious scores in excess of a predetermined threshold.

In some embodiments, the predetermined range of malicious scores is a range of malicious scores below a predetermined threshold.

According to another aspect of the present invention, there is provided a tangible computer readable medium storing instructions which, when executed by a processor, cause the processor to perform the method of claim 1 as defined hereinafter.

According to another aspect of the present invention, there is provided a system for detecting malicious domains, the system comprising: a processor; and a memory configured to store domain data for a plurality of domains and a relationship parameter which represents a relationship between at least two of the domains, wherein the memory stores machine readable instructions which, when executed by the processor, cause the processor to: generate a graph for the domains by: identifying a plurality of domain nodes which each correspond to one of the plurality of domains; connecting the domain nodes with a plurality of edges, each edge connecting two domain nodes that are related to one another by the selected relationship parameter; and calculating an edge weight for each edge which represents the strength of the relationship between the domains of the domain nodes connected by the edge; wherein the machine readable instructions, when executed by the processor, further cause the processor to: identify at least one domain node as a known malicious domain node and the other domain nodes as candidate domain nodes; calculate a malicious score for each candidate domain node based on the edge weight of each edge connecting the candidate domain node to a known malicious domain node; and identify a domain in the plurality of domains as malicious if the malicious score for the candidate domain node of the domain is within a predetermined range of malicious scores.

In some embodiments, the domain data is Domain Name System (DNS) data which comprises a DNS record for each of the domains.

In some embodiments, the DNS data comprises a plurality of DNS records for the plurality of domains stored at a predetermined time.

In some embodiments, each DNS record comprises a first domain identifier and a second domain identifier for a respective one of the plurality of domains.

In some embodiments, the first domain identifier indicates a domain name and the second domain identifier indicates an IP address for the domain.

In some embodiments, each DNS record further comprises first timestamp data indicating a first time at which the domain was resolved to a corresponding IP address and second timestamp data indicating a second time at which the domain was resolved to the IP address, the second time being more recent than the first time.

In some embodiments, the second time is the last time at which the domain was resolved to the IP address.

In some embodiments, the memory stores machine readable instructions which, when executed by the processor, further cause the processor to: select the plurality of domains from the DNS data by selecting the domains having a DNS record with first and second timestamps that are within a predetermined time observation window.

In some embodiments, the relationship parameter is indicative of a similarity between a plurality of the DNS records.

In some embodiments, the relationship parameter is indicative of a plurality of the domains resolving to the same IP address.

In some embodiments, the relationship parameter is indicative of domains that have been controlled by a similar set of entities.

In some embodiments, the predetermined range of malicious scores is a range of malicious scores in excess of a predetermined threshold.

In some embodiments, the predetermined range of malicious scores is a range of malicious scores below a predetermined threshold.

BRIEF DESCRIPTION OF THE DRAWINGS

So that the present invention may be more readily understood, embodiments of the present invention will now be described, by way of example, with reference to the accompanying drawings; in which:

FIG. 5a is a graph illustrating the true positive rate and the false positive rate for a one-week dataset, FIG. 5b is a graph illustrating the true positive rate and the false positive rate for a two-week dataset.

DETAILED DESCRIPTION OF THE INVENTION

Introduction

Figure 1:
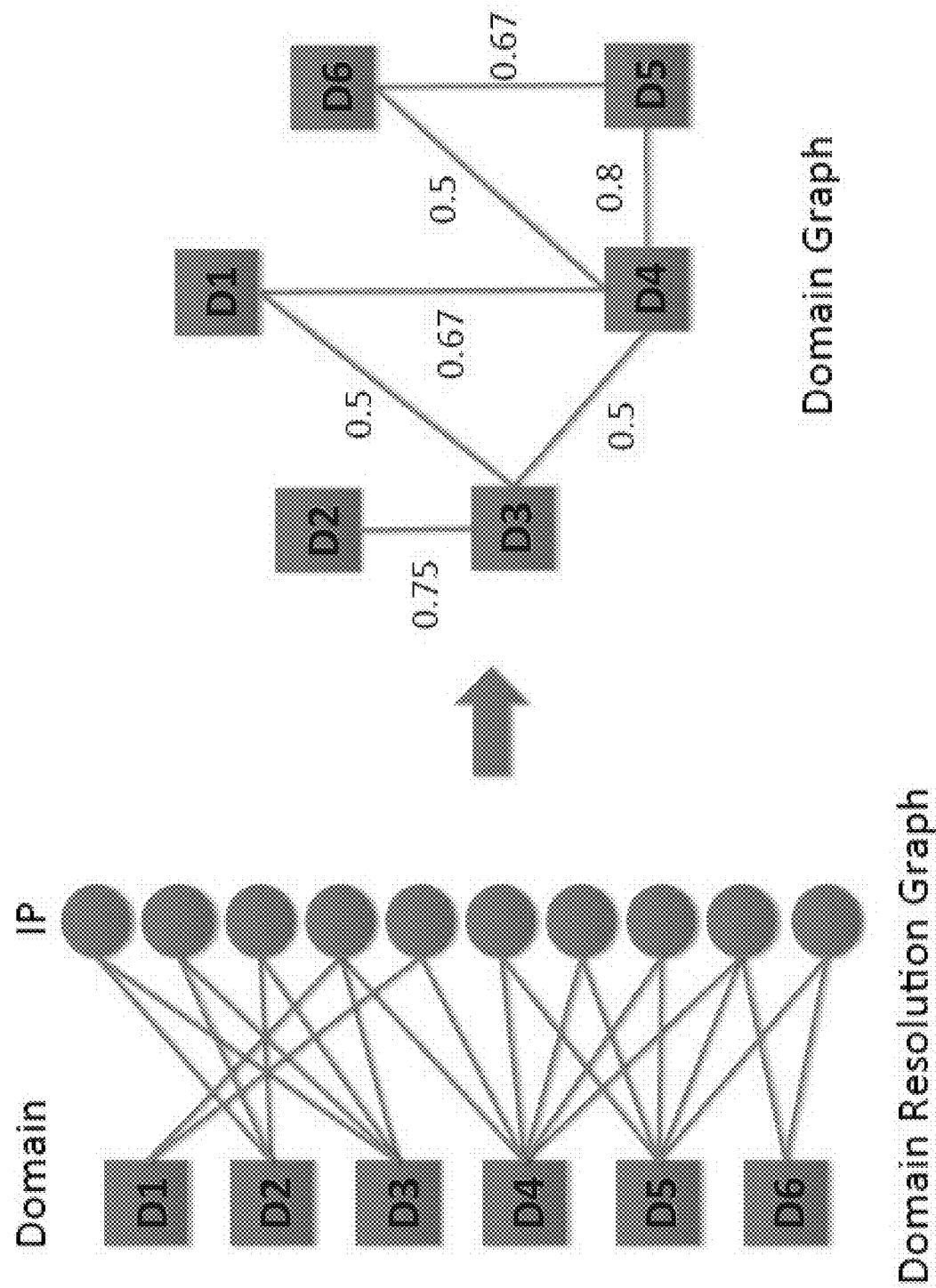
FIG. 1 is an example of a domain graph of some embodiments.

Embodiments of the present invention take a complementary approach to conventional approaches for detecting malicious domains. Instead of focusing on local features, some embodiments discover and analyze global associations among domains. The key challenges are (1) to build meaningful associations among domains; and (2) to use these associations to reason about the potential maliciousness of domains. For the first challenge, embodiments take advantage of the modus operandi of attackers.

To avoid detection, malicious domains exhibit dynamic behavior by, for example, frequently changing the malicious domain-IP resolutions and creating new domains. This makes it very likely for attackers to reuse resources. It is indeed commonly observed that over a period of time multiple malicious domains are hosted on the same IPs and multiple IPs host the same malicious domains, which creates intrinsic association among them.

For the second challenge, embodiments use a graph-based inference technique over associated domains. The approach is based on the intuition that a domain having strong associations with known malicious domains is likely to be malicious. Carefully established associations enable the discovery of a large set of new malicious domains using a very small set of previously known malicious ones. Experiments over a public passive DNS database show that some embodiments can achieve high true positive rates (over 95%) while maintaining low false positive rates (less than 0.5%). Further, even with a small set of known malicious domains (e.g. two hundred malicious domains), some embodiments can discover a large set of potential malicious domains (in the scale of up to tens of thousands).

Some embodiments take a complementary approach to conventional methods and systems. Instead of focusing on local features, some embodiments discover and analyze global associations among domains. In some embodiments, such global associations are derived mainly from passive DNS data, though other data sources (such as server logs and WHOIS records) could be integrated to enhance confidence of such associations. The observation is that, though many features of DNS records can be altered per individual domains, attackers have to host malicious domains on IPs that they control or have access to. Additionally, as an example, tactics implemented by malicious domains (e.g., frequent creation of new domains and fast fluxing), in the continuous struggle to evade detection, makes them exhibit dynamic characteristics among groups of malicious domains instead of individual domains.

For example, Cova et al. [4] offered a longitudinal analysis of the rogue antivirus threat ecosystem. Their analysis shows that malicious domains used in such campaigns are moving throughout the Internet space over time, usually in bulk, while sharing a number of varying features among them. Consequently, it is very likely that multiple malicious domains may end up being hosted at the same IPs, and similarly, multiple IPs are used to host the same malicious domains over time, which creates intrinsic associations among them. To eliminate such associations, attackers would have to make sure that each malicious domain is hosted by very few IPs, and each IP hosts very few malicious domains. These kinds of tactics greatly limit the utilization of resources available to attackers, incur heavy costs, and curb their profits. Some embodiments therefore utilize the associations between domains and IPs as a robust way to study how attackers organize and deploy malicious resources, which can help discover new malicious domains using known malicious domains.

The approach of some embodiments is based on the intuition that a domain having strong associations with known malicious domains is likely to be malicious. Given a set S of known malicious domains, other domains are assessed based on the strength of their associations with those in S. To make this idea effective, several issues are addressed: first, how to define the association between domains. As described above, such association should not be easily avoided by attackers without greatly affecting their attacking capabilities. Further, it should reflect non-trivial relationships between domains; second, given such associations and known malicious domains, how to assess the maliciousness of other related domains and how to combine such malicious scores into a global measure, as a domain may be connected with several malicious ones directly or indirectly; third, since some embodiments focus on global patterns instead of local patterns, the approach needs to ensure that the inference process is efficient and scalable.

Some embodiments use graph analysis techniques to discover new malicious domains given a seed of existing known malicious domains.

Some embodiments provide a robust measure to reflect the intrinsic associations between resources controlled by attackers. Specifically, two domains are connected if they are hosted by the same IPs during a period of time. Compared with many existing features for malicious domain detections, the method and system of some embodiments use the properties of how malicious resources are utilized. Therefore, it is hard to eliminate such connections without affecting the utilization of malicious resources. Some embodiments utilize heuristics to enhance the confidence of such associations to better reveal connections between malicious domains. Some embodiments take into account the fact that domains may use the same IP without being related to each other, especially in web hosting scenarios. This concept is discussed in more detail below.

Based on the above associations, some embodiments construct graphs to reflect the global correlations among domains, which enable analysis well beyond those that only focus on the local properties of a host or domain. Associations between domains do not necessarily imply maliciousness. In fact, they may happen due to legitimate management of Internet resources. To discover malicious domains, some embodiments utilize a path-based mechanism to derive a malicious score of each domain based on their topological connection to known malicious domains.

Extensive experiments have been conducted to evaluate the effectiveness of some embodiments based on a large-scale publicly available passive DNS database as well as ground truth collected from public sources. The practicality was evaluated through careful analysis of the tradeoff between true positives and false positives for different parameter configurations. The experimental results show that some embodiments can achieve high true positive rates (over 98%) while maintaining low false positive rates (less than 0.5%). Further, even with a small set of known malicious domains (e.g. two hundred), some embodiments can discover a large set of potential malicious domains (in the scale of up to tens of thousands).

Some embodiments utilize global association patterns to discover potential malicious domains but some embodiments do not discount local features. Instead, some embodiments aim to offer a further mechanism to detect malicious domains. In some embodiments, the scheme is integrated with robust local features to further improve its effectiveness. For example, in some embodiments besides relying on known malicious domains to bootstrap the method, each domain may also have an initial score based on some local features. In some embodiments this score is then enhanced through (or combined with) the malicious scores derived from the scheme to provide an approach that is both highly accurate and robust. Meanwhile, different from many past efforts (e.g. [1, 3]), some embodiments are not a generic classification scheme, i.e., some embodiments do not build a classifier that can label any given domain as malicious or non-malicious. Instead, some embodiments are designed to discover new malicious domains associated with known malicious ones, which can be limited (e.g., just a few malicious domains found in the early phase of an emerging spam campaign) or do not exhibit clear patterns of local features to be successfully classified. In fact, some embodiments can be combined with classification-based schemes such that it takes the output from a classifier as the seeds to discover other malicious domains whose local features do not fit the malicious profile of the classifier.

There have been many previous attempts to identifying malicious domains, utilizing different types of data and analysis techniques. The following description discusses briefly conventional approaches and contrasts the conventional approaches from embodiments of the invention.

Notos [1] was a pioneer work to use passive DNS data to identify malicious domains. Notos dynamically assigns reputation scores of unknown domains based on features extracted from DNS queries. EXPOSURE [3] follows a similar methodology, and overcomes some of the limitations of Notos (e.g., EXPOSURE requires less training time and less training data). Moreover, EXPOSURE differentiates itself by being agnostic to the kind of services that the malicious domains provide (e.g., botnet, Phishing, Fast-flux).

The method and system of some embodiments is complementary to EXPOSURE and Notos by focusing on global topologies of the deployment of malicious domains over IPs instead of their local features. EXPOSURE and Notos perform best when they can get access to individual DNS queries, which could be quite sensitive. Our approach meanwhile can work on public aggregated passive DNS data, and thus will not cause privacy concerns. This point is described in more detail below.

Phoenix [10] utilizes passive DNS data to differentiate between DGA and non-DGA malicious domains. Phoenix models pronounceable domains, likely generated by humans, and considers domains that violate the model as DGA generated. While some embodiments detect unknown malicious domains, Phoenix is mainly concerned with tracking and intelligence beyond detection. In fact the output of some embodiments can be used as input feed to Phoenix.

Work by Antonakakis et al. [2] detects DGAs by monitoring DNS traffic. The observation is that the existence of DGAs in a network will increase the amount of observed Non-Existent Domain (NXDomain) responses in the network trace. Some embodiments instead focus on the analysis of successful resolutions of domains.

Manadhata et al. [7] proposed to identify malicious domains by analyzing DNS query logs. The main technique is to build a bipartite host-domain graph (which hosts query what domains), and then apply belief propagation to discover malicious domains based on known malicious and benign domains. The rationale is that, if a host queries a malicious domain, that host is more likely to be infected. Similarly, a domain queried by an infected host is more likely to be malicious. Passive DNS data can also be modeled as a bipartite graph. It seems compelling to identify malicious domains by applying belief propagation over passive DNS data. However, the inference intuition in [7], though working very well for host-domain graphs, does not carry through well in passive DNS data. Experiments that are discussed below compare methods and systems of some embodiments with those in [7].

Rahbarinia et al. [8] proposed a behavior-based technique to track malware-controlled domains. The main idea is to extract user behavior patterns from DNS query logs beyond the bipartite host-domain graph. As a contrast, methods and systems of some embodiments exploit passive DNS data instead of user DNS query behavior. Features used in [8] are not applicable to passive DNS data.

SMASH [15] is an unsupervised approach to infer groups of related servers involved in malware campaigns. It focuses on server side communication patterns extracted from HTTP traffic to systematically mine relations among servers. SMASH is novel in proposing a mechanism that utilizes connections among malicious severs to detect malware campaigns in contrast with classification schemes that solely use individual server features. Our approach is similar to SMASH in establishing server associations as bases for identifying new malicious servers, but complements SMASH by utilizing passive DNS data, which offers privacy benefits. Additionally, instead of using second-level domain names, methods and systems of some embodiments establish associations among fully qualified domain names as well. This relaxes the assumption in SMASH that servers with the same second-level domain belong to the same organization and hence, some embodiments detect malicious dynamic DNS servers.

The path-based inference of malicious domains of some embodiments is partially inspired by reputation management in decentralized systems [11], where global trust are computed through feed-backs on local interactions, though the application context is totally different. In particular, some embodiments are based on maliciousness propagation along domain associations while conventional reputation systems rely on trust transitivity in social contexts.

Passive DNS Data

The approach of the some embodiments is related to using a graph analysis technique of data from passive DNS replication. Passive DNS replication captures inter-server DNS messages through sensors that are voluntarily deployed by contributors in their DNS infrastructures. The captured DNS messages are further processed and then stored in a central DNS record database which can be queried for various purposes [14].

Though passive DNS data contain rich information of different aspects of DNS, some embodiments analyze A records in the database. Specifically, each record is of the form $\langle d, i, T_f, T_i, c \rangle$, meaning domain d is resolved to IP i, and $T_f$ and $T_i$ are the timestamps when this resolution was observed for the first and the last time respectively in the database, and c is the number of times that this resolution was observed via passive DNS replication. The period $(T_f, T_i)$ is known as the observation window of the resolution.

In practice, a domain may be hosted in multiple IPs, and an IP may host multiple domains during different periods of time. A unique record exists for each different domain to IP resolution. Further it is possible (in fact many such cases exist) in the passive DNS database that two records have the same domain but different IPs with overlapping observation windows, which suggests that the domain is alternatively hosted in different IPs. Similarly, records with the same IP but different domains with overlapping observations windows may suggest the IP hosts multiple domains at the same time.

Given a set of A records in the passive DNS database, some embodiments construct a domain-resolution graph, a bipartite graph with one side corresponds to domains and the other side to IPs. An edge is formed from a domain node u to an IP node i if record $\langle d, i, T_f, T_i, c \rangle$ exists. Some embodiments identify malicious domains based on a domain-resolution graph.

Several recent efforts propose to identify malicious domains through host-domain graphs [7] (also called user query behavior [8]), i.e., which host or user queries the DNS servers about which domain in an enterprise or an ISP. Compared with host-domain graphs, domain-resolution graphs offer several practical advantages. First, passive DNS replication collects data globally from a large group of contributors. It offers a more comprehensive view of mapping between domains and IPs, while host-domain graphs are usually limited to the perspective of a single enterprise or an ISP. Second, host-domain graphs contain private information about individual users, which tends to be very sensitive. It would be hard to share such information without raising serious privacy concerns. Domain-resolution graphs, on the other hand, are aggregated information of domain-AP mapping instead of about individuals. They are publicly available, and any findings over them can be shared without privacy risks. Third, the association revealed between domains through domain-resolution graphs is not tightly coupled with the behavior of individual users, and therefore tends to be harder to manipulate, which we will elaborate more in the rest of this section. Nevertheless, domain-resolution graphs and host-domain graphs are two important data sources for malicious domain discovery. Techniques developed for each type of graphs are complementary and could be combined to offer effective techniques to defend against malicious domains.

Both Notos [1] and Exposure [3] use features derived from passive DNS data. However, as mentioned earlier, most of these features are local, in the sense that they are measured from the perspective of individual domains (e.g., statistics of IPs associated with a domain and average length and character distributions of domain names).

Some embodiments instead focus on global structural patterns among domains rather than local features. Therefore, some embodiments can be seen as complementary to those conventional approaches, by exploring the problem from a different dimension. Also note that some of the features used in past work (e.g., time-based features like daily similarity, repeating patterns, average TTL etc.) require access to DNS responses to each individual DNS query, which may be sensitive and often not publicly available. On the other hand, some embodiments target totally public passive DNS data, and do not require such features.

Domain Graph

If a domain d is known to be malicious, another domain with "strong association" with d is likely to be malicious as well. Therefore, from a small set of known malicious domains, some embodiments can discover a large set of unknown malicious ones. The key questions are (1) how to define association between domains from passive DNS data that supports such inferences; and (2) how to determine maliciousness of domains that have no direct associations with known malicious domains.

Intuitively, if two domains are hosted at the same IP during a certain period of time, they are at least partly related. For example, the domains be owned by the same owner so that they can be arranged to be hosted alternatively at the IP.

The more IPs that the two domains are co-hosted at, the more likely there exists strong associations between them. The same intuition can also be applied to discover strong association between two IPs if they host many common domains. There are many situations in practice where two domains are co-hosted at many IPs but they are not related in any way in terms of malicious domain inferences, which is discussed in more detail below. The following description presents in detail how to define the association between domains, as well as the inference process of malicious domains.

FIG. 1 shows an example domain resolution graph and its corresponding domain graph. A domain resolution graph is an undirected bipartite graph $G(D, I, E)$ where $D$ is a set of domains, $I$ is a set of IPs, and an edge $\{d, i\} \in E$ if domain d is resolved to IP i. Given a domain d, we denote ip(d) the set of IPs that d is resolved to. Similarly, domain(i) denotes the set of domains resolved to an IP i. In practice, in some embodiments are limited to passive DNS records within a certain period of time to ensure relevance of the analysis results. The tradeoff between longer and shorter analysis periods is discussed below.

Given a domain resolution graph, some embodiments construct a domain graph, an undirected weighted graph $DG(D, E)$, where $D$ is a set of domains, and an edge $e=\{d_1,d_2\} \in E$ if $ip(d_1) \cap ip(d_2) \neq \emptyset$, i.e., $d_1$ and $d_2$ are co-hosted at some common IPs. The weight of an edge $\{d_1,d_2\}$, denoted $w(\{d_1,d_2\})$, should reflect the strength of association between the two domains. There are many possible ways to define edge weights that would be contemplated by a person skilled in the art. In some embodiments the edge weights are defined to reflect two intuitions as:

$$w(d_1, d_2) = \begin{cases} 1 - \frac{1}{1 + |ip(d_1) \cap ip(d_2)|} & \text{if } d_1 \neq d_2 \\ 1 & \text{otherwise} \end{cases}$$

First, the more common IPs two domains resolve to; the stronger their association, therefore, the bigger the weight. Second, when the association is strong enough, adding additional common IPs would not make much difference in terms of association. For example, two domains with 50 common IPs would already have very strong association. Their edge weight therefore should be close to (instead of for example half of) that of the case if they share 100 common IPs. On the other hand, when the number of common IPs is small, increasing common IPs should have a bigger impact on the strength of association and thus edge weights as well. Note that when two domains $d_1$ and $d_2$ do not share any common IPs, $w(d_1,d_2)=0$ according to the above definition. Clearly $w(d_1,d_2) \in [0,1)$ if $d_1 \neq d_2$. FIG. 1 shows an example domain resolution graph and its corresponding domain graph.

Another seemingly compelling way to measure association between domains is to use Jaccard similarity, which has been applied in many applications, including in security contexts [13]. In some embodiments this would be defined as:

$$\frac{|ip(d_1) \cap ip(d_2)|}{|ip(d_1) \cup ip(d_2)|}$$

However, some embodiments do not use Jaccard similarity due to the observation that the set of common IPs alone reflects strong association between domains, even if each domain has many of their own unique IPs beside the common ones (which will result in low Jaccard similarity).

A domain graph often reveals implicit association between domains. When visualized, we often find interesting communities of domains, which may guide further investigation when combined with other intelligence.

Figure 2:
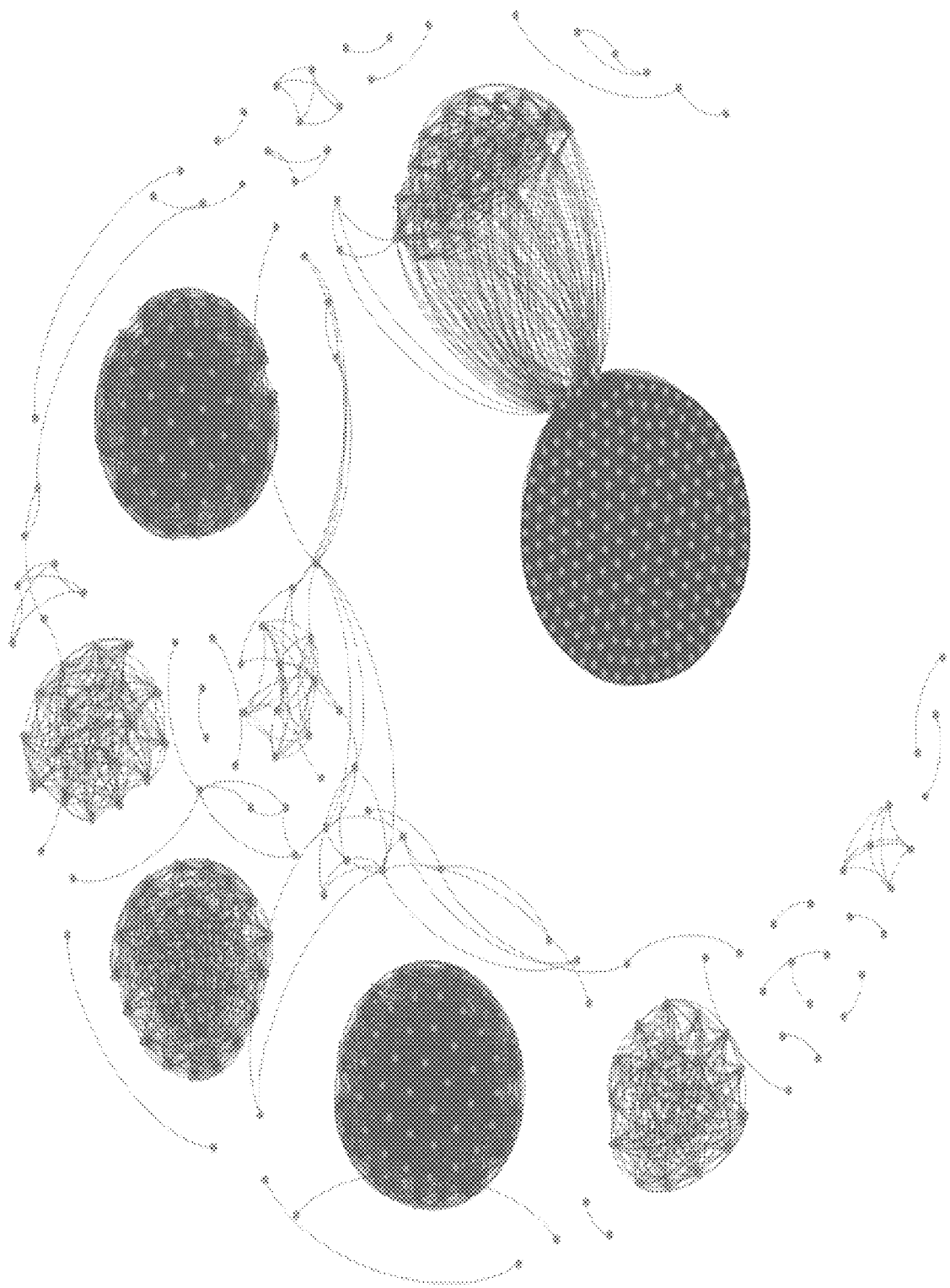
FIG. 2 is a further example of a domain graph of some embodiments.

For example, FIG. 2 shows the domain graph extracted from the subdomains of 3322.org (a dynamic DNS service known to have many malicious subdomains) from the passive DNS dataset of March 2014. One can clearly see the structures and communities among those subdomains. One can explore how to utilize domain graphs to discover malicious domains. However, domain graphs of some embodiments are useful for many other domain related security analysis and intelligence.

Path-Based Inference

Given a set of known malicious domains, called seeds, some embodiments infer the maliciousness of unknown domains based on their associations with the seeds. For those directly connected with the seeds in the domain graph, some embodiments use edge weights directly to capture such associations between domains which do not share any IP (i.e., no direct edge between them).

Let $P=(d_1, d_2 \ldots d_{n-1}, d_n)$ be a path between $d_1$ and $d_2$. The weight of P is defined to be the product of all the edge weights in P, i.e. $w(P)=\Pi_{1 \leq i \leq n-1} w(d_i, d_{i+1})$. A path implies a sequence of inferences of association. The longer the path is, the less the certainty of the inference. Therefore, some embodiments discount the association by the edge weight of each hop. As multiple paths may exist between two domains, some embodiments choose the weight of the strongest path (i.e., with the largest weight among all paths) to capture their association, i.e., given all paths $P_1 \ldots, P_k$ between domains $d_1$ and $d_2$, we define $assoc(d_1, d_2)=\max_{1 \leq i \leq k} w(P_i)$.

It is possible that the association between two connected domains is larger than their edge weight because though they may not share many common IPs, they may form strong association through other domains. Such indirect association allows us to "propagate" maliciousness of the seed domains to the whole graph instead of only to their direct neighbors.

In some embodiments the malicious score of domains is defined based on their association with the seed domains. Let S be the set of seeds. Given a domain d, denote M(d) as the list (assoc($s_1$,d), . . . assoc($s_n$,d)), where $s_i \in$ S and assoc($s_1$,d)>=assoc($s_{i+1}$,d), for i=1, . . . n−1. In other words, M(d) is a sorted list of the association of d to each of those in the seeds. In some embodiments the malicious score of d given S is then defined as:

$$mal(d, S) = assoc(s_1, d) + (1 - assoc(s_1, d)) \sum_{i=2,\ldots,n} \frac{1}{2^{i-1}} assoc(s_i, d)$$

Intuitively, the largest association between d and a known malicious domain contributes the most to the maliciousness of d. This is further enhanced with its association with other seeds in an exponential decay manner.

This design is to capture two intuitions of malicious domain inferences. First, a strong association with even a single known malicious domain would be convincing evidence of a potential malicious domain. Second, weak association with multiple known malicious domains cannot be easily accumulated to form strong evidence of a domain's maliciousness, because weak association may happen in many legitimate network management scenarios. Some embodiments can conduct inferences through strong, beyond normal associations to ensure inference accuracy. The use of exponential decay reflects this intuition. It is easy to see that mal(d, S) is in the range [0, 1], as the latter part of the equation is weighted by a factor 1−mal($s_1$, d).

Note that some embodiments do not simply define:

$$mal(d, S) = \sum_{i=1,\ldots,n} \frac{1}{2^{i-1}} assoc(s_i, d)$$

A mathematical reason is that this definition will produce a score between 0 and 2 instead of between 0 and 1. One could certainly scale it back to the range [0-1]. But a more technical reason is that this definition will give a different score to the cases where (1) a domain has a strong association with a single malicious seed, and (2) a domain has strong associations with several malicious seeds. The latter case's score would be approximately up to two times of that of the former case. As mentioned above, the former case can be treated as already with convincing evidence, and thus should have a score close to the latter case, which is the rational of the weight 1-assoc($s_1$,d).

Once the malicious score for each domain is computed, we can specify a threshold t between [0,1] such that domains whose malicious score is over t will be labeled as potential malicious domain.

Example 3.1. Consider the simple domain graph in FIG. 1. Assume $D_3$ and $D_5$ are known to be malicious, i.e., S={$D_3$, $D_5$}, and one would like to compute mal($D_1$, S). One can see that the strongest path between $D_1$ and $D_3$ is simply the edge connecting them. Therefore, assoc ($D_1$, $D_3$)=0.5. Similarly, the strongest path between $D_3$ and $D_5$ is ($D_3$, $D_4$ $D_5$) and so assoc($D_1$, $D_5$)=0.536. Then, since assoc($D_1$, $D_5$)>assoc($D_1$, $D_3$), we have mal($D_1$,S)=0.536+(1-0.536)×0.5×½$^1$=0.625. One can compute similarly that mal($D_2$,S)=0.788, mal($D_4$, S)=0.85 and mal($D_6$,S)=0.714. If one sets the threshold t=0.75, $D_2$ and $D_4$ will be flagged as potential malicious domains.

Practical Considerations

The above description of some embodiments is based on the observation that a strong association between two domains exists if they are hosted at many common IPs in a period of time. This association may suggest that they are controlled by the same owner. For example, a botnet master may deploy phishing websites among a subset of bots it controls. These web-sites will then be associated due to the IPs of those bots. However, there are many legitimate scenarios where domains share IPs. For example, an organization may also host several of its own domains among a set of servers for load balancing or fault tolerance. Such a scenario does not invalidate some embodiments, as those domains are still "controlled" by the same entity. If one of them is malicious due to the compromise of such servers, other domains hosted at the same servers could also likely be malicious. A more challenging case is due to "public IPs", such as those in web hosting, cloud and content delivery networks (CON), where domains from unrelated owners would be hosted at the same pool of IPs. For example, two domains hosted at Amazon Web Service (AWS) could have many shared IPs. But the fact that one domain serves malicious contents does not imply that the other will have high chance to be malicious as well, which renders the observation invalid. Note that this situation is different from dynamic DNS services such as no-ip.com and dnsdynamic.org. In dynamic DNS, though a user can create multiple subdomains under a top domain, no hosting service is provided. The user still has to host those subdomains in his own servers, which results in linking those subdomains together when they share IPs.

An obvious way to overcome this problem is to exclude from the analysis such public IPs, e.g., those belonging to AWS, CloudFlare and Akamai. However, it would be impractical to list all public IPs, given the large number of service providers in the Internet. Some embodiments therefore adopt two heuristics to deal with this problem pragmatically. First, if an IP hosts a very large number of domains in a period of time, it is likely to be a public IP. Therefore, some embodiments exclude IPs if they host more than t domains within a certain time period, where t is a configurable parameter. Second, to further strengthen the confidence of domain associations, instead of simply counting the number of common IPs that two domains share, we consider the diversity of the shared IPs as reflected by their ASNs when computing their edge weight. Specifically, given a set I of IPs, let asn(I) denote the set of ASNs that the IPs in I belong to. Then in some embodiments the weight between two domains $d_1$ and $d_2$ in a domain graph is redefined as:

$$w(d_1 d_2) = 1 - \frac{1}{1 + |asn(ip(d_1) \cap ip(d_2))|} \text{ if } d_1 \neq d_2$$

Though two unrelated domains may be hosted in the same pool of public IPs of one service provider (e.g., AWS), it is unlikely that they are both hosted at public IPs from two or more service providers (e.g., both AWS and CloudFare). Here some embodiments use ASNs of IPs to approximately identify IPs from different service providers. In practice it is possible that a service provider owns IPs from multiple ASNs (e.g., both AS16509 and AS14618 belong to Amazon).

Therefore, two unrelated domains may still be associated even if they only use services from a single provider. The following experimental results show that such cases are rare and have limited impact on the effectiveness of methods and systems of some embodiments. Besides using ASNs, we could also use WHOIS records of IPs to identify those belonging to the same provider. However, WHOIS records are well-known to be noisy often with conflicting information due to the lack of standard formats and heterogeneous information sources.

Another practical concern is performance and scalability. The performance bottleneck may come from two steps. The first is to generate domain graphs. In the worst case, if there are n domains in a domain resolution graph, each IP hosts all the domains, and hence, it may take $O(n^2|I|)$ steps to build the corresponding domain graph, where $|I|$ is the number of IPs in the a domain resolution graph. Though in practice a domain graph tends to be sparse, significant number of edges will be generated if an IP hosts a huge number of domains (for example, an IP of Amazon may host hundreds of thousands of domains). This is because an edge needs to be created for each pair of domains hosted at that IP. Fortunately, the public IP pruning of some embodiments (excluding IPs with degrees larger than t from the domain resolution graph) also helps alleviate this problem, because now the worst case number of steps to establish the domain graph is bounded by $O(t^2|I|)$. $t^2$ can be a large constant. However, due to the power law distribution of the degrees of IPs in domain resolution graphs (which will be shown in experiments section), the actual size of domain graphs is much smaller than the theoretical bound $O(t^2|I|)$, which means it is very manageable with moderate computing resources or with distributed computing platforms like Hadoop.

Compared with the large number of domains a public IP may host, the number of IPs that a domain may resolve to is relatively small (at most several thousands). Therefore, some embodiments do not perform any filtering of domains based on their degrees in the domain resolution graph, which means some embodiments will not miss domains involved in fast-fluxing.

The second potential performance bottleneck is to compute the strongest paths from domains to seeds. The strongest path problem can be mapped to the classical weighted shortest path problem. Specifically, given a domain graph G(D, E), some embodiments construct another graph G'(D, E), such that for any edge $e=\{d_1,d_2\}$ in G, the weight of e in G' is $$\ln\left(\frac{1}{w(d_1, d_2)}\right).$$

As $w(d_1,d_2)$ is between 0 and 1, $$\ln\left(\frac{1}{w(d_1, d_2)}\right)$$

is positive.

Then a path $P=(d_1, \ldots, d_n)$ is the strongest path between $d_1$ and $d_n$ in G if and only if P is the shortest weighted path from $d_1$ and $d_n$ in G. Thus, standard shortest path algorithms can be easily adapted to compute the malicious scores of domains.

With Dijkstra's algorithm using a min-priority queue, the worst-case complexity of this step would be $O(|S|(|E|+|D|\log|D|))$, where S is the set of seeds. Usually S is much smaller compared to the scale of a domain graph. Therefore, with moderate computing resources, the computation cost of this step is acceptable in practice. In particular, domain graphs tend to be composed of multiple connected components. The algorithm for malicious score computation can be performed on each component instead of the whole graph. It also allows us to easily speed up through parallel computation with multi-core or GPU processors or Hadoop. In the experiments discussed below, malicious score computation is done by a GPU processor, which is not a performance bottleneck for methods and systems of some embodiments.

Algorithm 1 shows the pseudocode of some embodiments that is evaluated experimentally in the description below.

Experiments

The technique of some embodiments is not a general classification scheme like Notos [1] and EXPO-SURE [3]. That is, some embodiments cannot take an arbitrary given domain and decide whether it is potentially malicious or not. For example, if a domain is not resolved by any host, it will not appear in the passive DNS database, which will then be irrelevant to some embodiments. Similarly, if a domain never shares IPs with other domains, it will not appear in the domain graph, and methods and systems of some embodiments is not applicable to such domain either. Some embodiments provide a discovery technique which tries to find previously unknown malicious domains from known ones. Therefore, its effectiveness should be evaluated in the scope of domains where the scheme applies. In other words, it could be seen as a complementary technique to existing classification techniques. Specifically, the evaluation focuses on the following three metrics:

True positive rate: Given a malicious domain in the domain graph, the probability that it will be labeled as potentially malicious.

False positive rate: Given a benign domain in the domain graph, the probability that it will be labeled as potentially malicious.

Expansion: From a set of known malicious domains, how many more domains will be discovered as potentially malicious, in other words, how much can some embodiments expand the set of malicious domains beyond those in the seeds.

---

Algorithm 1: Algorithm to discover malicious domains through passive DNS data

Input:  G(I, D, E), a domain resolution graph
        t, degree threshold
        S, a set of known malicious domains
        m, malicious score threshold
Output: M, a set of potential malicious domains
1 for each IP i in I do
2  |  if degree(i) > t then
3  |  |  remove i from G;
4  |  end
5 end
6 Denote the remaining graph RG';
7 Let DG be an empty graph;
8 for domains $d_1$ and $d_2$ in RG' with common neighboring IPs do
9  |  if $|\text{asn}(ip(d_1)) \cap ip(d_2))| > 1$ then
   |  |  Add edge $\{d_1, d_2\}$ to DG:

Algorithm 1: Algorithm to discover malicious domains
through passive DNS data

| | $w(d_1, d_2) = 1 - \dfrac{1}{1 + |asn(ip(d_1) \cap ip(d_2))|}$;
11 | end
12 end
13 M = φ;
14 Let CC be the set of connected components in DG:
15 for each C in CC do
16 | if ∩ S ≠ φ then
17 | | for each d in CC do
18 | | | compute mal (d, S);
19 | | | if mal(d, S) >= m then
20 | | | | add d to M;
21 | | | end
22 | | end
23 | | end
24 end
25 return M Since some embodiments focus on discovering unknown malicious domains, expansion is an important metric that reflects the usefulness of methods and systems of some embodiments. To better illustrate, consider conceptually another scheme which, for example, builds a graph only with domains whose names possess patterns typical to domain generation algorithms (DGAs). A scheme designed for such a graph may show a very high true positive rate and a very low false positive rate, according to the above definitions. But it may have a very low expansion, as it can only discover DGA-generated domains, which may not be quite useful in practice. Some embodiments meanwhile do not rely on any other features when building the domain graph, which will yield a high expansion.

Methods and systems of some embodiments have two parameters, the malicious score threshold and the seeds set size, both of which will impact the tradeoff of the above three metrics. Intuitively, the lower the threshold is, or the larger the set of the seeds are, the higher the true positive rate and the expansion, but the higher the false positive rate as well.

Datasets
Passive DNS Data.

The passive DNS database was downloaded from www.dnsdb.info using the website's API. As the database is updated constantly, the snapshot used was the one obtained in the middle of December 2014. The database contains various types of DNS records. This example uses A records to ensure the actual mapping between domains and IPs. As mentioned before, for each domain-to-IP resolution, the database keeps timestamps regarding when this resolution is first and last seen by the passive DNS sensors. A resolution is said to belong to a period of time if its first-seen timestamp falls into that period.

The following description provides experimental results on two datasets. One is for the first week of November 2014, and the other is for the first two weeks of November 2014. The reason for choosing datasets for periods of different length is to check whether the scale of data would have any impact on the effectiveness of some embodiments.

Figure 3:
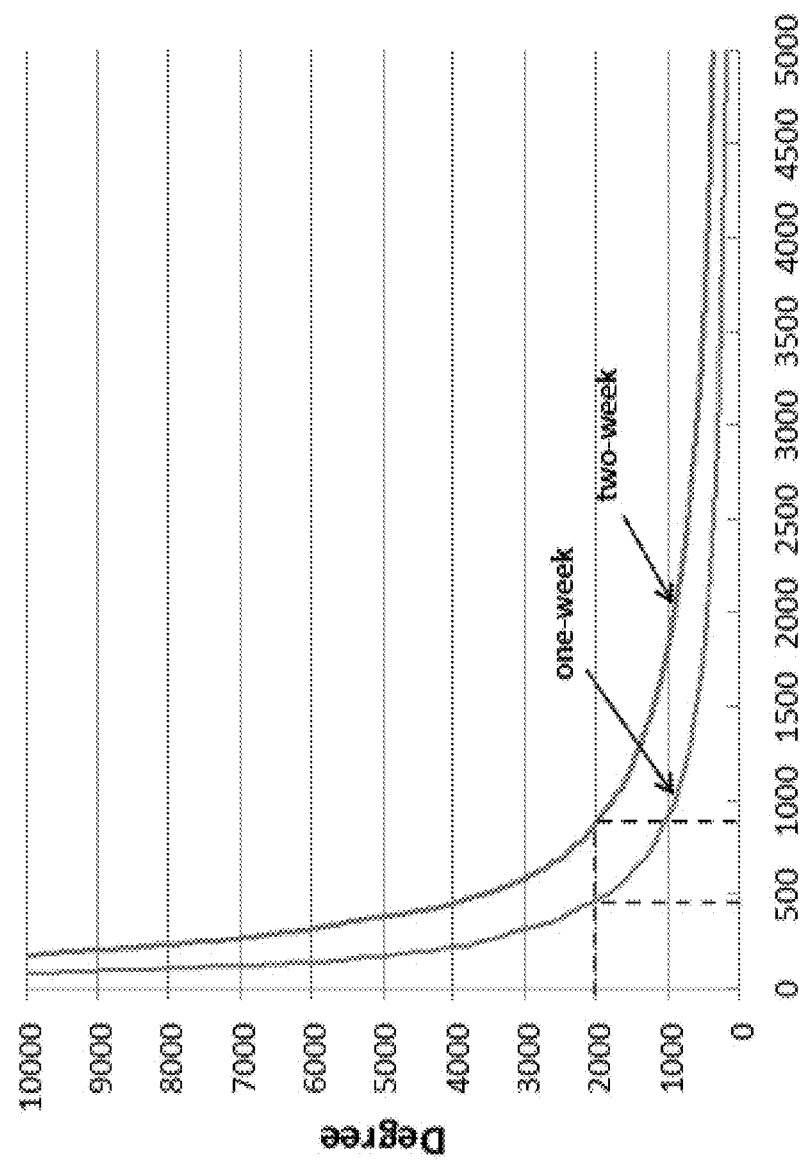
FIG. 3 is a graph illustrating the degree of distribution of IF nodes in domain graphs for two example datasets.

The experiments do not consider public IPs in which anybody can host their domains if they choose to do so. The experiments use a heuristic that if an IP hosts more than t domains, it is treated as a public IP. FIG. 3 shows the degree distribution of IPs in the domain resolution graphs of both datasets, where x axis are IPs sorted based on their degrees and y axis are their corresponding degrees. Only the 5000 IPs with the highest degrees are shown in FIG. 3. The distribution appears to follow a power law distribution, where a small set of IPs have degrees significantly higher than that of others. Based on the above figures, t is set to be 2000, where only less than 500 and 900 IPs respectively are removed from the domain resolution graphs of the one-week and the two-week datasets, which is a very negligible percentage of the original set of IPs.

Table 1 shows the statistics of the domain graphs (DG in Algorithm 1) constructed from the two datasets. The domain graphs contain much fewer domains compared to domain resolution graphs. Indeed, most of the domains in the domain resolution graph do not share more than one IP from different ASNs with other domains, and these domains will not appear in the domain graph. An edge in the domain graph thus reveals a beyond-random connection between two domains, which allows reliable inferences from known malicious domains.

TABLE 1

Statistics of domain graphs constructed
from the two passive DNS datasets

| Dataset | Domain | Edges |
|---------|--------|-------|
| One-    | 54K    | 65.3M |
| Two-    | 98K    | 120.4 |

Figure 4:
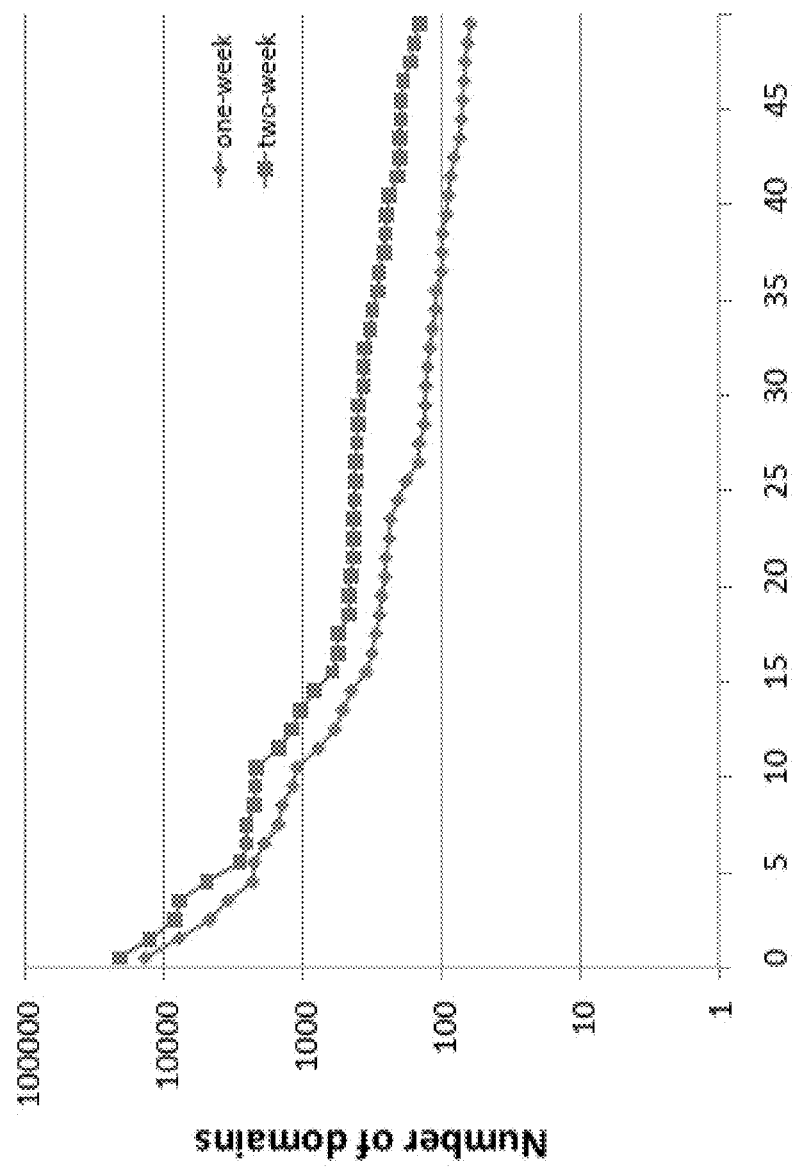
FIG. 4 is a graph illustrating the distribution of connected component sizes in domains graphs for two example datasets.

FIG. 4: Distribution of connected component sizes in domain graphs for the two datasets. Only the 50 connected components with the largest sizes are shown in FIG. 4.

The cost of malicious score computation is largely determined by the sizes of the connected components in domain graphs. FIG. 4 shows the distribution of the number of nodes of connected components in the domain graphs of both datasets. Note that the y-axis is in logarithmic scale. Clearly they also follow a power-law like distribution.

Ground Truth.

There are many commercial as well as public domain blacklists, which can be combined to get a list of malicious domains. Though each such blacklist may have false positives, generally there is strong evidence if a domain is blacklisted, as long as the blacklist is reputable. Thus it is relatively easy to build a ground truth of malicious domains. One example uses VirusTotal (www.virustotal.com), which, when given a domain; queries it over more than 60 well-known blacklists. Each domain in a domain graph is submitted to VirusTotal using its public API, and those listed by at least one of the blacklists form the ground truth of known malicious domains.

Obtaining ground truth of benign domains is more challenging. No blacklist is exhaustive. One cannot simply consider a domain to be benign if it is not blacklisted by any of the blacklists. It may be that the domain has been scanned and no malicious content is found, or it may be because that domain has never been scanned before.

Some embodiments build benign domain ground truth using Alexa top ranked domains. Specifically, a domain is treated as benign if its top-level domain is one of the Alexa Top 20K domains (http://www.alexa.com). Domains with ranks lower than 20K are not included, as malicious domains are known to exist in the Alexa top domain list, especially those with relatively low ranks. On the other hand, past efforts often perform certain filtering of Alexa top domains when building benign ground truth (e.g., only consider domains consistently appearing in the top domain lists for a period of time, or remove dynamic DNS service domains such as no-ip.com). As a contrast; we take a more conservative approach, and do not do any filtering of the Alexa Top 20K domains. It is more conservative in the sense that it is more likely to work counteractively when measuring false positives. For example, an attacker may register a subdomain under a dynamic DNS service (e.g., malicious.no-ip.com). Even if some embodiments successfully discover it as a malicious domain, it is treated as a false positive, as no-ip.com is one of Alexa Top 20K domains.

The ground truth for the one-week dataset contains around 6.5K malicious domains and 6.5K benign domains. That for the two-week dataset is approximately double the size (with around 11.5K malicious domains and 12.1K benign domains). Table 2 shows the statistics of the ground truth for the domain graphs of the one-week and two-week datasets.

TABLE 2

Statistics of the ground truth of the two datasets

| Dataset | Domains | Malicious | Benign |
| --- | --- | --- | --- |
| One-week | 54K | 6.5K | 6.5K |
| Two-week | 98K | 11.6K | 12.1K |

The ground truth of benign domains can have its own limitations. In particular, Alexa top ranked domains are highly popular domains. They are in general of high-quality and well-maintained. A scheme with low false positive rate for Alexa top domains does not necessarily imply the same when it is applied to the large amount of benign but unpopular domains. In other words, a measure of false positive rates based on Alexa top domains tends to be lower than the actual false positive rate. Unfortunately, there is no well accepted practice for determining that a domain is benign, nor there are any large scale dataset of benign domains beyond Alexa top domains. Some embodiments therefore rely on Alexa top domains.

Experimental Results

For the domain graph built from each dataset, some embodiments vary the set size of the seeds and the threshold to study their impacts on the three metrics. Specifically for each given seed size k, we randomly select k domains from the malicious ground truth as the seeds, and calculate the malicious scores of all other domains in a domain graph. Some embodiments then vary the malicious threshold and measure the true positives, false positives, as well as the expansion. Each experiment is run 10 times with different randomly selected seeds, and the average of each metrics is reported. For the size of seeds, it is set to be 0.05% all the way to 2% of the number of domains in the domain graph. A very small portion of the ground truth is chosen to investigate how well some embodiments can discover more malicious domains even with limited knowledge of known malicious domains. As to the malicious score threshold, it is varied all the way from 0.5 to 0.95.

Varying Malicious Score Threshold

The first study examines the tradeoff between true positives and false positives, when varying the malicious score threshold. Intuitively, the lower the threshold, the higher the true positive and meanwhile the higher the false positives. FIGS. 5a and 5b show the ROC curves of the false positive and the true positive rates when varying the malicious threshold, for example, when the size of the seeds is 0.3%, 0.5%, 0.7%, and 0.9% for the two datasets. From FIG. 5a we see that some embodiments can achieve above 90% true positive rate with a false positive rate lower than 0.2% in the one-week dataset. In general, the lower the malicious threshold is, the higher the false positive rate. However, it is interesting to observe that when the seed size is small (e.g., 0.3%), even for low malicious thresholds, some embodiments can still get high true positive rates (around 90%) with very low false positive rates (lower than 0.01%). The reason is that when the set of seeds is small, a domain can only get its malicious score from a few connected seeds. Therefore, even a low malicious score suggests strong association with known malicious domains. On the other hand, when the set of seeds is large, a domain may get its malicious score due to weak associations with many seeds, which has a higher chance to be a false positive. Therefore, for a large set of seeds, a higher malicious threshold is needed to reduce false positives. Meanwhile, if the threshold is very high (above 0.9), even with a relatively large set of seeds, true positive rates drop dramatically. FIGS. 5a and 5b suggest that in general a threshold between 0.7-0.85 yields good tradeoff between true positives and false positives.

Meanwhile, from FIG. 5b one can observe that, though the general trend of tradeoff between true and false positives of the two-week dataset is similar to that in the own-week dataset, it is clearly worse than that of the one-week dataset. To have a false positive rate around 0.5%, our scheme can only achieve a true positive rate around 90% but not much higher. After a closer examination of the two-week dataset, one can observe that the number of new domain resolutions in the second week of November 2014 is smaller than that in the first week. Therefore, compared to the one-week domain graph, the new domains and edges in the two-week domain graph are mainly due to pairs of domains who have common IPs in two weeks but with no common IPs in each individual week.

For example, suppose an edge $\{d_1, d_2\}$ appears in the two-week domain graph but not in the one-week one, and they have two common IPs $i_1$ and $i_2$ from different ASNs. Then either the resolutions from $d_1$ and $d_2$ to $i_1$ and $i_2$ all happen in the second week, or these resolutions happen across two weeks. Our examination shows that the latter case accounts for the majority of new edges in the two-week domain graph. Intuitively, if the sharing of common IPs between two domains happens in a short period of time, it indicates a stronger association between them. On the other hand, the longer the period is, the more likely the sharing of common IPs happens unintentionally, and thus less reliable for malicious domain inferences. Since the majority of new edges are due to sharing of IPs across two weeks instead of a single week, the malicious inference from the two-week dataset is less effective than that from the one-week dataset.

The above observation shows that temporal granularity of datasets to build domain graphs would also affect the effectiveness of some embodiments. Naturally, if the granularity is too small (e.g., one hour), many associations between malicious domains would be missed as shared IPs are not formed yet. Meanwhile, if the granularity is too big (e.g., five years), a lot of false positives will be introduced due to weak associations. One possible solution is to introduce temporal factors into the weight of edges. Particularly, depending on how temporally close two domains share an IP (within one week, two weeks, one month, etc.), the contribution of the shared IF to the weight between the two domains will be different to capture the above observation.

Varying Size of the Set of Seeds

Figure 6B:
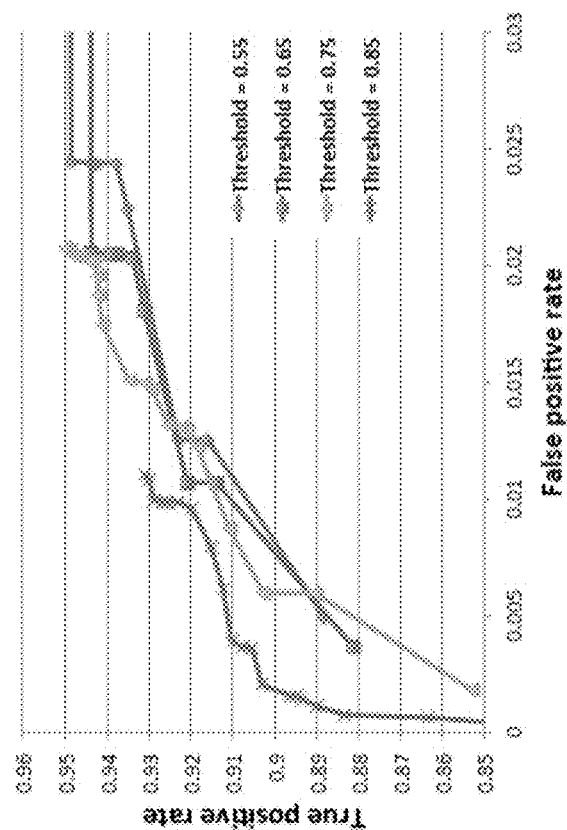
FIG. 6b is a graph illustrating the true positive rate and the false positive rate for a two-week dataset when varying the size of seeds.
Figure 6A:
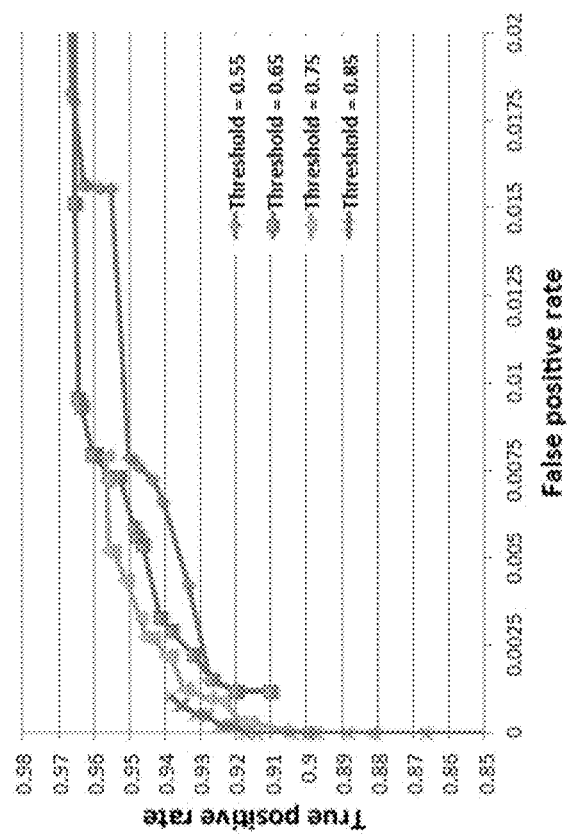
FIG. 6a is a graph illustrating the true positive rate and the false positive rate for a one-week dataset when varying the size of seeds.

FIGS. 6a and 6b show both datasets the ROC curves of the true positive rate and the false positive rate when varying the size of seeds, for example, when the malicious thresholds are set to 0.55, 0.65, 0.75, and 0.85. The size of seeds is varied from 0.05% all the way to 2% of the domain graph size. One can see that; for a given threshold, especially for relatively small ones (e.g., 0.55 and 0.65), increasing the seed size will cause a quick jump of false positives, due to reasons explained above (i.e., with a large set of seeds, a domain may get its malicious score because of weak associations with many seeds). It is clear that, when the threshold is high (e.g., 0.85), false positives are well controlled even for large seeds.

The above experiment results suggest that to have a good tradeoff between true positives and false positives some embodiments could either have small set of seeds with low malicious thresholds or have a large set of seeds (relative to all malicious domains) while setting the threshold relatively high (between 0.7 to 0.85). In practice, however, it is not possible to know for sure whether the known malicious domains collected is large enough. Thus, the general practice of some embodiments would be to obtain as many known malicious domains as possible to form the seeds, and then set a high threshold value (e.g., 0.85) to avoid high false positives.

One can again observe that the ROC curve of the two-week dataset is inferior to that of the one-week dataset, due to the same reason as explained above.

Expansion

Figure 7B:
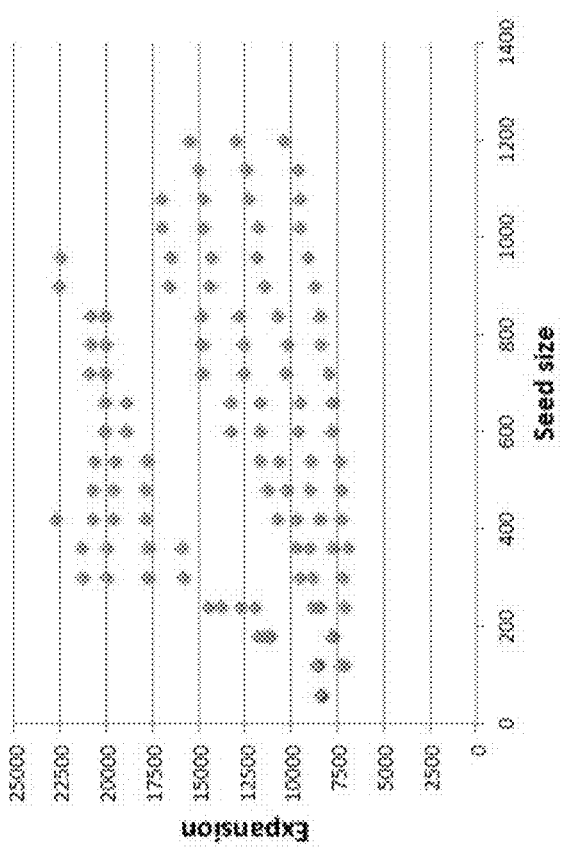
FIG. 7b is a graph further illustrating the expansion and the seed size for a one-week dataset.
Figure 7A:
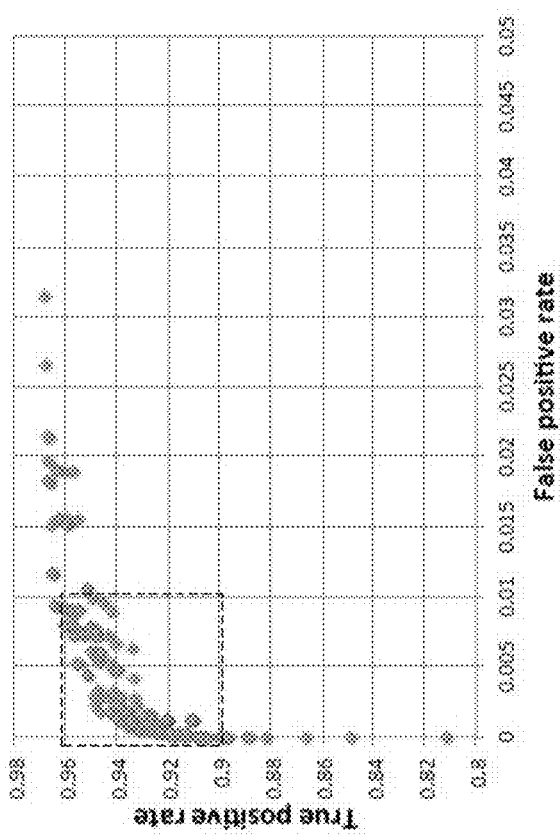
FIG. 7a is a graph further illustrating the true positive rate and the false positive rate for a one-week dataset.

Expansion reflects how many more potentially malicious domains one can discover given a set of seeds. Ideally, one would like to have a large expansion while maintaining high true positive rates and low false positive rates. This experiment chooses several parameter configurations (seeds set size and malicious threshold) which yield high true positive rates (≥0.9) and low false positive rates (≤0.01), and then plot the expansion against the seed size. FIGS. 7a and 7b show expansion of configurations with high true positive rates and low false positive rates for the one-week dataset. FIG. 7a shows the ROC curves for all the configurations tested for the one-week dataset. Configurations that fall into the dashed box are chosen to plot their expansions, which is shown in FIG. 7b. One can see that even with moderate seed sizes (0.1% to 0.7% of the domain graph size), some embodiments can discover around 8000 to 12000 potential malicious domains, which is one to two orders of magnitude of the original seeds set size.

Figure 8B:
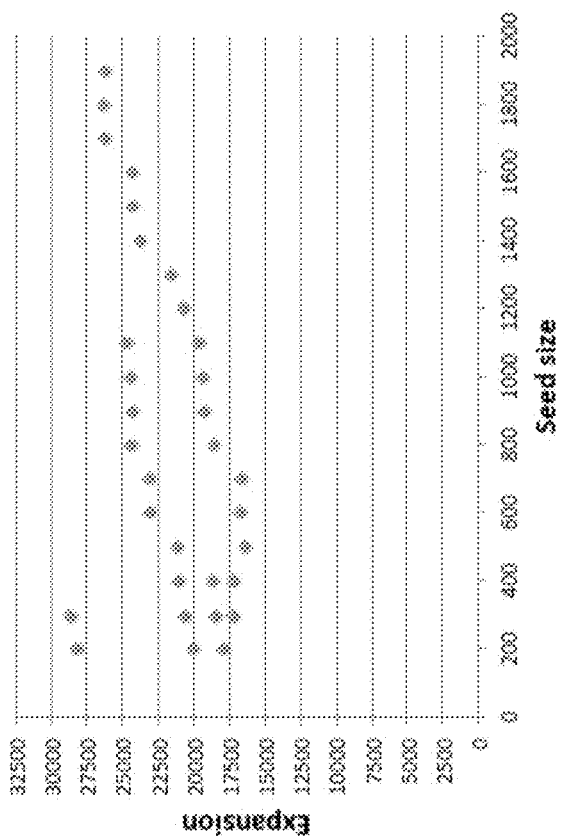
FIG. 8b is a graph further illustrating the expansion and the seed size for a two-week dataset.
Figure 8A:
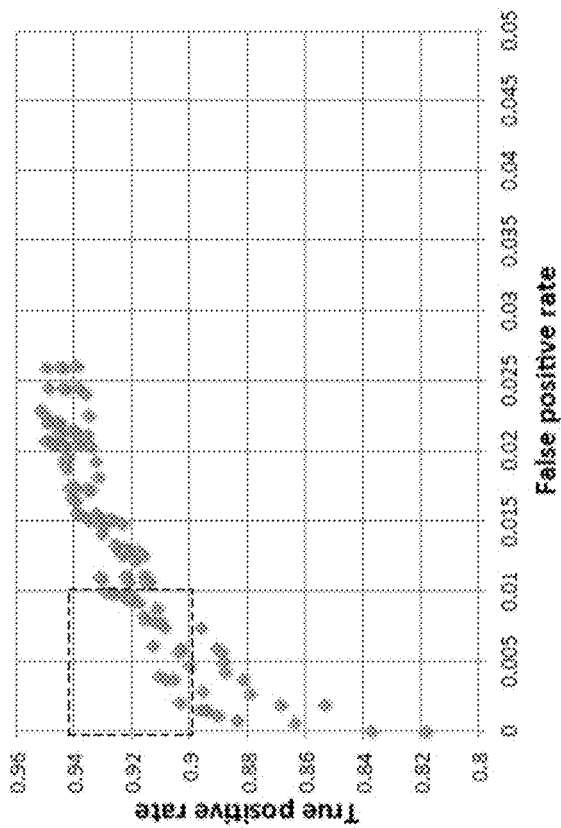
FIG. 8a is a graph further illustrating the true positive rate and the false positive rate for a two-week dataset.

FIGS. 8a and 8b show expansion of configurations with high true positive rates and low false positive rates for the two-week dataset. A similar observation about expansion for the two-week dataset is shown in FIGS. 8a and 8b. Specifically, for configurations that yield high true positive rates (≥0.9) and low false positive rates (≤0.01), their expansions range from around 16000 to 29000 while the seed sizes vary from 200 to 1000. Also note that there are much fewer configurations plotted in FIGS. 8a and 8b than in FIGS. 7a and 7b, for reasons given before.

Compare with Belief Propagation

Figure 9:
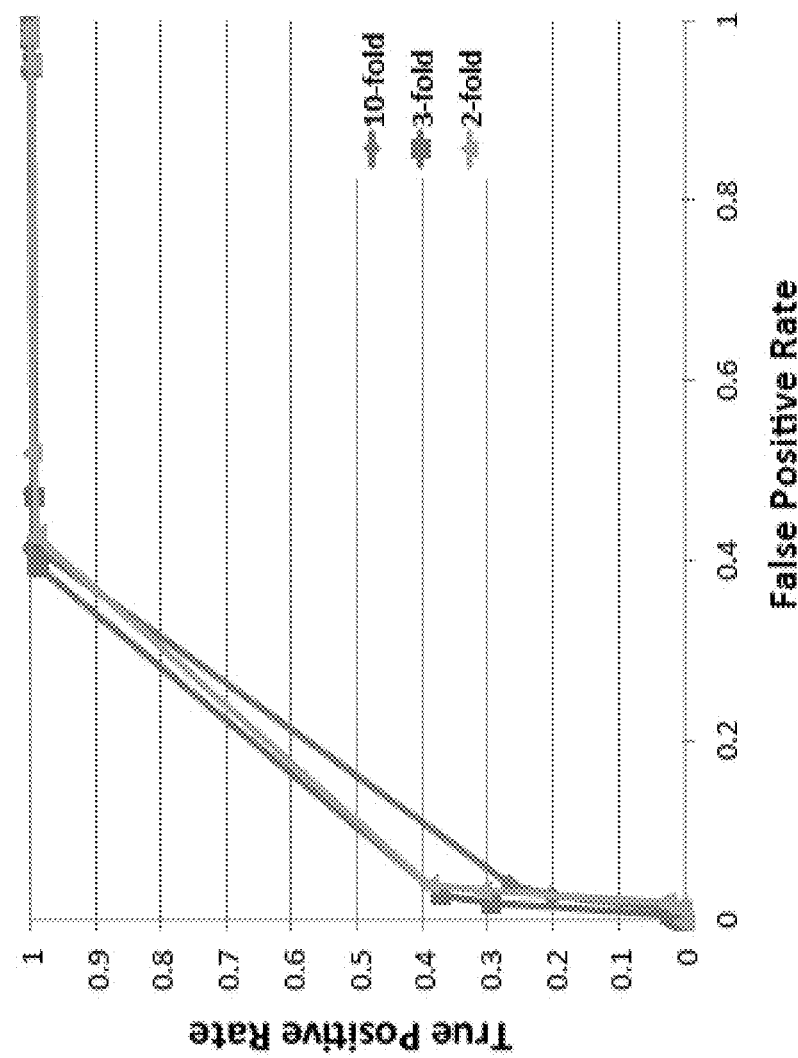
FIG. 9 is a graph illustrating the true positive rate and the false positive rate for a belief propagation approach of some embodiments.

As mentioned above, it is known to use belief propagation to infer malicious entities, e.g., domains and files. One of the representative approaches is by Pratyusa et al, [7], which applies belief propagation to bipartite host-domain graphs based on seeds of both known malicious domains (from proprietary blacklists) and benign domains (from Alexa top ranked domains). As a domain resolution graph is also bipartite with one side being domains, it seems appealing to apply belief propagation on a domain resolution graph to discover malicious domains. The effectiveness of using belief propagation is discussed below in the context of some embodiments. In particular, the example considers the bipartite domain resolution graph of the one week dataset, and constructs the ground truth of malicious domains as described above in under the heading Datasets. For the ground truth of benign domains, the example built it from Alex top ranked 10000 domains as used in [7]. The example performs k-fold tests to get the true and false positive rates (i.e., the ground truth are evenly divided into k parts randomly. k−1 parts are used as seeds for belief propagation, and the remaining one part is for testing to compute true and false positive rates). The example uses the same priors and edge potentials as in [7] for belief propagation (shown in tables 3 and 4). The result of the experiment is shown in FIG. 9.

TABLE 3

Priors assigned to a domain according to the domain's state for belief propagation

| Domain | P(malicious) | P(benign) |
|---|---|---|
| Malicious | 0.99 | 0.01 |
| Benign | 0.01 | 0.99 |
| Unknown | 0.5 | 0.5 |

TABLE 3

Edge potential matrices for belief propagation.

| | Benign | Malicious |
|---|---|---|
| Benign | 0.51 | 0.49 |
| Malicious | 0.49 | 0.51 |

One can see that, for the approach of using belief propagation, to get a meaningful true positive rate (around or above 90%) the false positive rate would be around 40% or higher, which is much worse than the results of some embodiments.

This result does not contradict with that in [7], as the conventional approach is designed for inference over a completely different type of data. Instead, it simply means that the inference intuition for host-domain graphs does not hold in domain resolution graphs. Therefore, though belief propagation works well to discover malicious domains over host-domain graphs, it performs poorly when dealing with passive DNS data.

Evaluation Beyond Virus Total

To further evaluate the feasibility and the accuracy of some embodiments, the detection results of some embodiments were manually cross-checked against other third party public services about malicious domains, including MacAfee Site Advisor, multirbl.valli.org, MXToolBox, DBL-Update, and the German inps.de-DNSBL. Specially, one check used all the malicious ground truth from VirusTotal as the seed set for the one week data (a total of above 6000 malicious domains), and then manually check samples of those domains whose malicious scores are over a certain threshold. The manual inspection reveals that, based on a 10% sample, 98% of domains with scores over 0.9 are reported to be malicious or suspicious by at least one of the above public services, which means that the potentially malicious domains discovered by some embodiments is highly accurate.

The approach of some embodiments adopts a technique to identify public IPs, which, though effective, is by no means exhaustive. It would be possible to develop more sophisticated algorithms to classify public/private IPs by considering advanced features (e.g., domain distributions, traffic patterns, etc.), which will further improve the accuracy of malicious domain inferences.

One potential issue with an approach for identifying malicious domains is that an attacker may "taint" a benign domain D by letting a known malicious domain D' point to the IPs of D, forming a fake association between D' and D. However, this is not a serious issue as it is more to the benefit of attackers to deploy stealthy and agile malicious domains rather than "framing" innocent domains. Nevertheless, such attacks can be thwarted partially through white listing of popular benign domains. For the case that D is benign but unpopular, if D is hosted in public IPs (as many such domains nowadays choose to do so), some embodiments ensure that even if a malicious domain is also hosted on the same set of public IPs, no association will be built between them as discussed in the practical considerations above. On the other hand, if D is hosted in its own private IPs, it is unlikely that those IPs belong to different ASNs, and therefore no strong association formed between D' and D, causing the "tainting" attack ineffective.

A technique of some embodiments discovers malicious domains by analyzing passive DNS data. Some embodiments take advantage of the dynamic nature of malicious domains to discover strong associations among them, which are further used to infer malicious domains from a set of existing known malicious ones. Some embodiments further utilize heuristics to handle complicated practical issues (such as web hosting) to improve both the effectiveness and efficiency of the technique. Experimental results show that some embodiments can achieve high true positive rates and low false positive rates with good expansion, i.e., discovering a significantly large set of potentially malicious domains with a small set of seeds.

Other embodiments seek to integrate passive DNS data with other network and application data to enrich mechanisms for finding robust associations between domains. Further embodiments utilize other inference mechanisms (e.g., different methods to compute malicious scores from multiple seeds). To deploy the scheme of some embodiments in practice, it is also important to take into account incremental malicious score updates when passive DNS data are constantly updated with new domain resolutions as well as when new malicious domains are added to the set of seeds.

Certain aspects of the present invention include process steps and instructions described herein in the form of an algorithm. It should be noted that the process steps and instructions of some embodiments of the present invention could be embodied in software, firmware, and/or hardware, and, when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium. Furthermore, the computers and/or other electronic devices referred to above may include a single processor or may be servers or architectures employing multiple processor designs for increased computing capability.

The algorithms and executable instructions described herein are not inherently related to any particular computer, virtualised system, or other apparatus.

Various general-purpose systems may also be used with programs in accordance with the teachings herein, or it may prove convenient to construct more specialised apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

In various embodiments, the present invention can be implemented as software, hardware, and/or other elements for controlling a computer system, computing device, or other electronic device, or any combination or plurality thereof.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

TECHNIQUES FOR IMPLEMENTING ASPECTS OF EMBODIMENTS OF THE INVENTION

[1] M. Antonakakis, R. Perdisci, D. Dagon, W. Lee, and N. Feamster. Building a dynamic reputation system for DNS. In 19th USENIX Security Symposium, Washington, D.C., USA, Aug. 11-13, 2010, Proceedings.

[2] M. Antonakakis, R. Perdisci, Y. Nadji, N. V. II, S. Abu-Nimeh, W. Lee, and D. Dagon. From throw-away tra_c to bats: Detecting the rise of dga-based malware. In Proceedings of the 21th USENIX Security Symposium, Bellevue, Wash., USA, Aug. 8-10, 2012.

[3] L. Bilge, E. Kirda, C. Kruegel, and M. Balduzzi. EXPOSURE: finding malicious domains using passive DNS analysis. In Proceedings of the Network and Distributed System Security Symposium, San Diego, Calif., USA, 6 Feb.-9 Feb. 2011.

[4] M. Cova, C. Leita, O. Thonnard, A. D. Keromytis, and M. Dacier. An analysis of rogue AV campaigns. In Recent Advances in Intrusion Detection, 13th International Symposium, RAID 2010, Ottawa, Ontario, Canada, Sep. 15-17, 2010. Proceedings.

[5] H. Crawford and J. Aycock. Kwyjibo: automatic domain name generation. Softw., Pract. Exper., 38(14): 1561{1567, 2008.

[6] M. Feily, A. Shahrestani, and S. Ramadass. A survey of botnet and botnet detection. In Emerging Security Information, Systems and Technologies, 2009. SECURWARE '09. Third International Conference on, June 2009.

[7] P. K. Manadhata, S. Yadav, P. Rao, and W. Horne. Detecting malicious domains via graph inference. In 19th European Symposium on Research in Computer Security, Wroclaw, Poland, Sep. 7-11, 2014. Proceedings.

[8] B. Rahbarinia, R. Perdisci, and M. Antonakakis. Segugio: E_cient behavior-based tracking of new malware-control domains in large isp networks. In 2015 45rd Annual IEEE/IFIP International Conference on Dependable Systems and Networks (DSN), Rio de Janeiro, Brazil, Jun. 22-25, 2015, 2015.
[9] P. Royal. Quantifying maliciousness in alexa top-ranked domains, December 2012.
[10] S. Schiavoni, F. Maggi, L. Cavallaro, and S. Zanero. Phoenix: Dga-based botnet tracking and intelligence. In Detection of Intrusions and Malware, and Vulnerability Assessment—11th International Conference, DIMVA 2014, Egham, UK, Jul. 10-11, 2014. Proceedings.
[11] R. Sherwood, S. Lee, and B. Bhattacharjee. Cooperative peer groups in NICE. Computer Networks, 0(4):523{544, 2006.
[12] E. Stinson and J. C. Mitchell. Towards systematic evaluation of the evadability of bot/botnet detection methods. In 2nd USENIX Workshop on Offensive Technologies, WOOT'08, San Jose, Calif., USA, Jul. 28, 2008, Proceedings.
[13] A. Tamersoy, K. A. Roundy, and D. H. Chau. Guilt by association: large scale malware detection by mining file-relation graphs. In The 20th ACM SIGKDD International Conference on Knowledge Discovery and Data Mining, KDD '14, New York, N.Y., USA Aug. 24-27, 2014.
[14] F. Weimer. Passive dns replication, October 2007.
[15] J. Zhang, S. Saha, G. Gu, S. Lee, and M. Mellia. Systematic mining of associated server herds for malware campaign discovery. In 35th IEEE International Conference on Distributed Computing Systems, ICDCS 2015, Columbus, Ohio, USA, Jun. 29-Jul. 2, 2015.

What is claimed is:

1. A method for detecting malicious domains in a network including a processor, the method comprising:
storing domain data for a plurality of domains;
selecting a relationship parameter, which represents a relationship between at least two of the domains;
generating a graph for the domains by:
identifying a plurality of domain nodes, which each corresponds to one of the plurality of domains;
connecting the domain nodes with a plurality of edges, each edge connecting two domain nodes that are related to one another by the selected relationship parameter; and
calculating an edge weight for the each edge, which represents the strength of a relationship between the domains of the domain nodes connected by the each edge;
identifying at least one domain node as a known malicious domain node and the other domain nodes as a candidate domain node;
calculating a malicious score for each candidate domain node based on the edge weight of the each edge connecting the candidate domain node to the known malicious domain node; and
identifying a domain in the plurality of domains as malicious if the malicious score for the candidate domain node of the domain is within a predetermined range of malicious scores,
wherein the domain data is Domain Name System (DNS) data, which comprises a DNS record for each of the domains,
wherein the DNS record further comprises first timestamp data indicating a first time at which the domain was resolved to a corresponding IP address and second timestamp data indicating a second time at which the domain was resolved to the IP address, the second time being more recent than the first time.

2. The method of claim 1, wherein the DNS data comprises a plurality of DNS records for the plurality of domains stored at a predetermined time.

3. The method of claim 1, wherein each DNS record comprises a first domain identifier and a second domain identifier for a respective one of the plurality of domains.

4. The method of claim 3, wherein the first domain identifier indicates a domain name and the second domain identifier indicates an IP address for the domain.

5. The method of claim 1, wherein the second time is the last time at which the domain was resolved to the IP address.

6. The method of claim 1, further comprising:
selecting the plurality of domains from the DNS data by selecting the domains having a DNS record with first and second timestamps that are within a predetermined time observation window.

7. The method of claim 1, wherein the relationship parameter is indicative of a similarity between a plurality of the DNS records.

8. The method of claim 1, wherein the relationship parameter is indicative of a plurality of the domains resolving to the same IP address.

9. The method of claim 1, wherein the relationship parameter is indicative of domains that have been controlled by a similar set of entities.

10. The method of claim 1, wherein the predetermined range of malicious scores is a range of malicious scores in excess of a predetermined threshold.

11. The method of claim 1, wherein the predetermined range of malicious scores is a range of malicious scores below a predetermined threshold.

12. A non-transitory computer readable medium storing instructions for performing a process to be executed by a processor, the process comprising:
storing domain data for a plurality of domains;
selecting a relationship parameter, which represents a relationship between at least two of the domains;
generating a graph for the domains by:
identifying a plurality of domain nodes, which each corresponds to one of the plurality of domains;
connecting the domain nodes with a plurality of edges, each edge connecting two domain nodes that are related to one another by the selected relationship parameter; and
calculating an edge weight for the each edge, which represents the strength of a relationship between the domains of the domain nodes connected by the each edge;
identifying at least one domain node as a known malicious domain node and the other domain nodes as a candidate domain node;
calculating a malicious score for each candidate domain node based on the edge weight of the each edge connecting the candidate domain node to the known malicious domain node; and
identifying a domain in the plurality of domains as malicious if the malicious score for the candidate domain node of the domain is within a predetermined range of malicious scores,
wherein the domain data is Domain Name System (DNS) data, which comprises a DNS record for each of the domains,
wherein the DNS record further comprises first timestamp data indicating a first time at which the domain was resolved to a corresponding IP address and second timestamp data indicating a second time at which the domain was resolved to the IP address, the second time being more recent than the first time.

13. A system for detecting malicious domains, the system comprising:
- a processor; and
- memory configured to store domain data for a plurality of domains and a relationship parameter, which represents a relationship between at least two of the domains, wherein the memory stores machine readable instructions which, when executed by the processor, cause the processor to:
- generate a graph for the domains by:
  - identifying a plurality of domain nodes, which each corresponds to one of the plurality of domains;
  - connecting the domain nodes with a plurality of edges, each edge connecting two domain nodes that are related to one another by the selected relationship parameter; and
  - calculating an edge weight for the each edge, which represents the strength of a relationship between the domains of the domain nodes connected by the each edge;
- identify at least one domain node as a known malicious domain node and the other domain nodes as a candidate domain node;
- calculate a malicious score for each candidate domain node based on the edge weight of the each edge connecting the candidate domain node to the known malicious domain node; and
- identify a domain in the plurality of domains as malicious if the malicious score for the candidate domain node of the domain is within a predetermined range of malicious scores,
- wherein the domain data is Domain Name System (DNS) data, which comprises a DNS record for each of the domains,
- wherein the DNS record further comprises first timestamp data indicating a first time at which the domain was resolved to a corresponding IP address and second timestamp data indicating a second time at which the domain was resolved to the IP address, the second time being more recent than the first time.

14. The system of claim 13, wherein the DNS data comprises a plurality of DNS records for the plurality of domains stored at a predetermined time.

15. The system of claim 13, wherein each DNS record comprises a first domain identifier and a second domain identifier for a respective one of the plurality of domains.

16. The system of claim 15, wherein the first domain identifier indicates a domain name and the second domain identifier indicates an IP address for the domain.

17. The system of claim 13, wherein the second time is the last time at which the domain was resolved to the IP address.

18. The system of claim 13, wherein the memory stores machine readable instructions which, when executed by the processor, further cause the processor to:
- select the plurality of domains from the DNS data by selecting the domains having a DNS record with first and second timestamps that are within a predetermined time observation window.

19. The system of claim 13, wherein the relationship parameter is indicative of a similarity between a plurality of the DNS records.

20. The system of claim 13, wherein the relationship parameter is indicative of a plurality of the domains resolving to the same IP address.

21. The system of claim 13, wherein the relationship parameter is indicative of domains that have been controlled by a similar set of entities.

22. The system of claim 13, wherein the predetermined range of malicious scores is a range of malicious scores in excess of a predetermined threshold.

23. The system of claim 13, wherein the predetermined range of malicious scores is a range of malicious scores below a predetermined threshold.

* * * * *